(12) United States Patent
Van Wiemeersch

(10) Patent No.: US 9,199,576 B2
(45) Date of Patent: Dec. 1, 2015

(54) TAILGATE POSITION DETECTION

(71) Applicant: Ford Global Technologies, LLC, Dearborn, MI (US)

(72) Inventor: John Robert Van Wiemeersch, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 99 days.

(21) Appl. No.: 13/974,418

(22) Filed: Aug. 23, 2013

(65) Prior Publication Data

US 2015/0054950 A1 Feb. 26, 2015

(51) Int. Cl.
*H04N 5/33* (2006.01)
*B60R 11/04* (2006.01)
*G08G 1/16* (2006.01)
*B60R 1/00* (2006.01)
*B60R 21/01* (2006.01)
*G06T 7/00* (2006.01)

(52) U.S. Cl.
CPC . *B60R 1/00* (2013.01); *B60R 21/01* (2013.01); *G06T 7/004* (2013.01)

(58) Field of Classification Search
None
See application file for complete search history.

(56) References Cited

U.S. PATENT DOCUMENTS

| | | |
|---|---|---|
| 5,430,432 A | 7/1995 | Camhi et al. |
| 6,374,766 B1 | 4/2002 | Clark |
| 6,836,209 B2 | 12/2004 | Ploucha |
| 7,000,563 B2 * | 2/2006 | Hensel .......... 116/35 R |
| 7,081,812 B2 | 7/2006 | Hastings, Sr. |
| 7,236,088 B2 | 6/2007 | Matsukawa et al. |
| 7,637,556 B2 | 12/2009 | Haber |
| 8,044,776 B2 | 10/2011 | Schofield et al. |
| 8,203,441 B2 | 6/2012 | Bolduan |
| 2003/0052969 A1 | 3/2003 | Satoh et al. |
| 2006/0251502 A1 | 11/2006 | Scharfenberger |
| 2007/0025597 A1 | 2/2007 | Breed et al. |
| 2007/0182817 A1 * | 8/2007 | Briggance ............ 348/118 |
| 2009/0167857 A1 * | 7/2009 | Matsuda et al. .......... 348/143 |
| 2010/0169013 A1 * | 7/2010 | Nakamura et al. ....... 701/213 |
| 2013/0063601 A1 * | 3/2013 | Wakabayashi et al. ...... 348/148 |
| 2013/0099908 A1 | 4/2013 | Salomonsson |
| 2014/0071279 A1 * | 3/2014 | Mokashi et al. ............ 348/148 |

* cited by examiner

*Primary Examiner* — Thomas Tarcza
*Assistant Examiner* — Timothy Nesley
(74) *Attorney, Agent, or Firm* — Frank MacKenzie; Bejin Bieneman PLC

(57) ABSTRACT

A system includes a camera module disposed on a vehicle. The camera module records an image and generates an image signal representing the image. The system further includes a processing device that receives the image signal generated by the camera module and determines whether a vehicle tailgate is open based on the image. A method includes receiving an image signal representing an image captured from a vehicle, processing the image signal, and determining whether a vehicle tailgate is open based on the image.

18 Claims, 6 Drawing Sheets

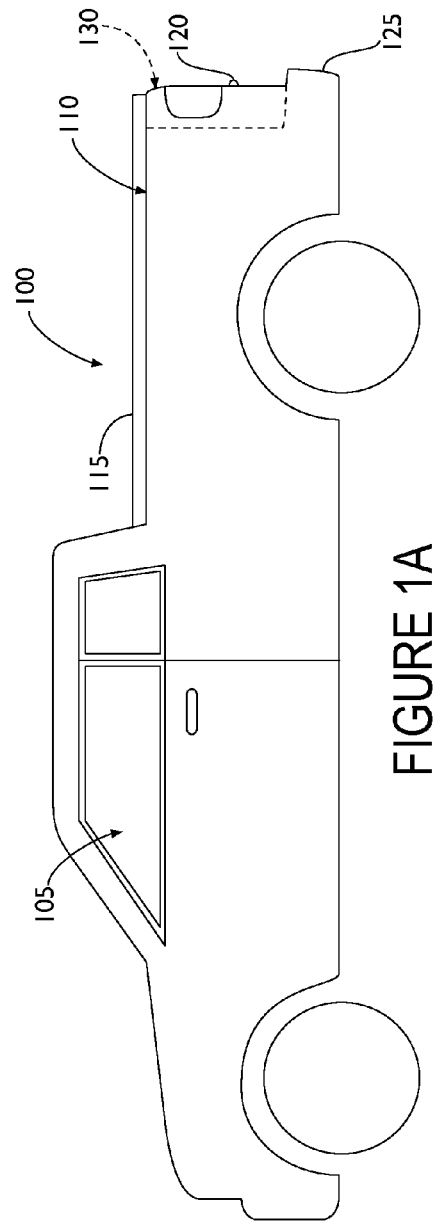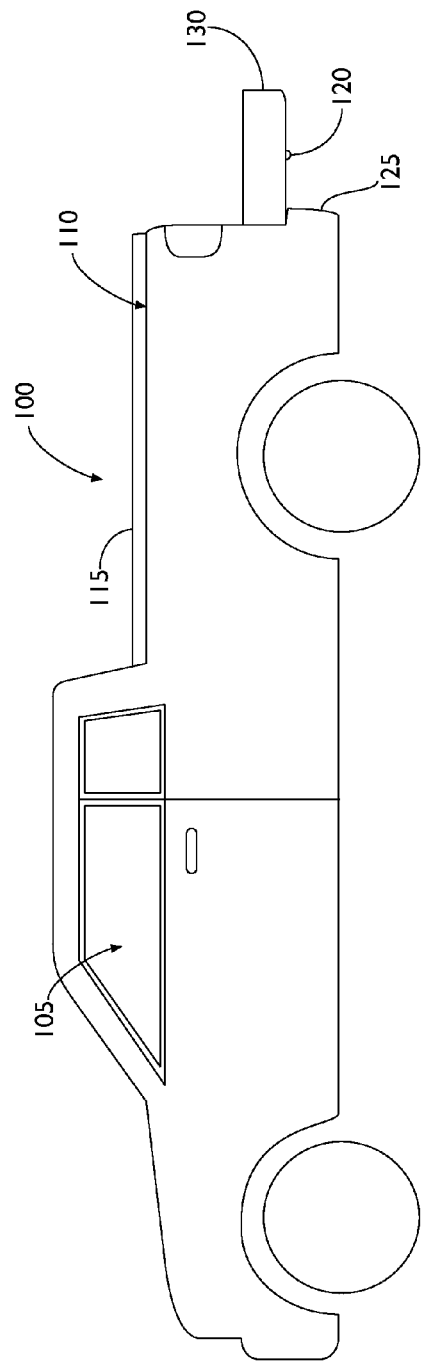

TAILGATE POSITION DETECTION

BACKGROUND

A cargo bed of a pickup truck is sometimes called a tonneau. Some pickup truck owners cover the tonneau for reasons such as concealing the cargo, protecting the cargo from exposure to the elements, and securing the cargo during transport. Further, some pick-up truck owners appreciate aesthetic qualities of tonneau covers. Tonneau covers are made from various materials such as cloth, vinyl, fiberglass, or plastic. Generally, tonneau covers can be removed, pulled back, opened, or otherwise positioned to give the pickup truck owner access to the cargo in the cargo bed. Instead of repositioning the tonneau cover, the tailgate of the pickup truck can be opened to access the cargo in the cargo bed.

BRIEF DESCRIPTION OF THE DRAWINGS

FIGS. 1A and 1B illustrate a pickup truck with a tailgate in various positions.

DETAILED DESCRIPTION

Figure 2:
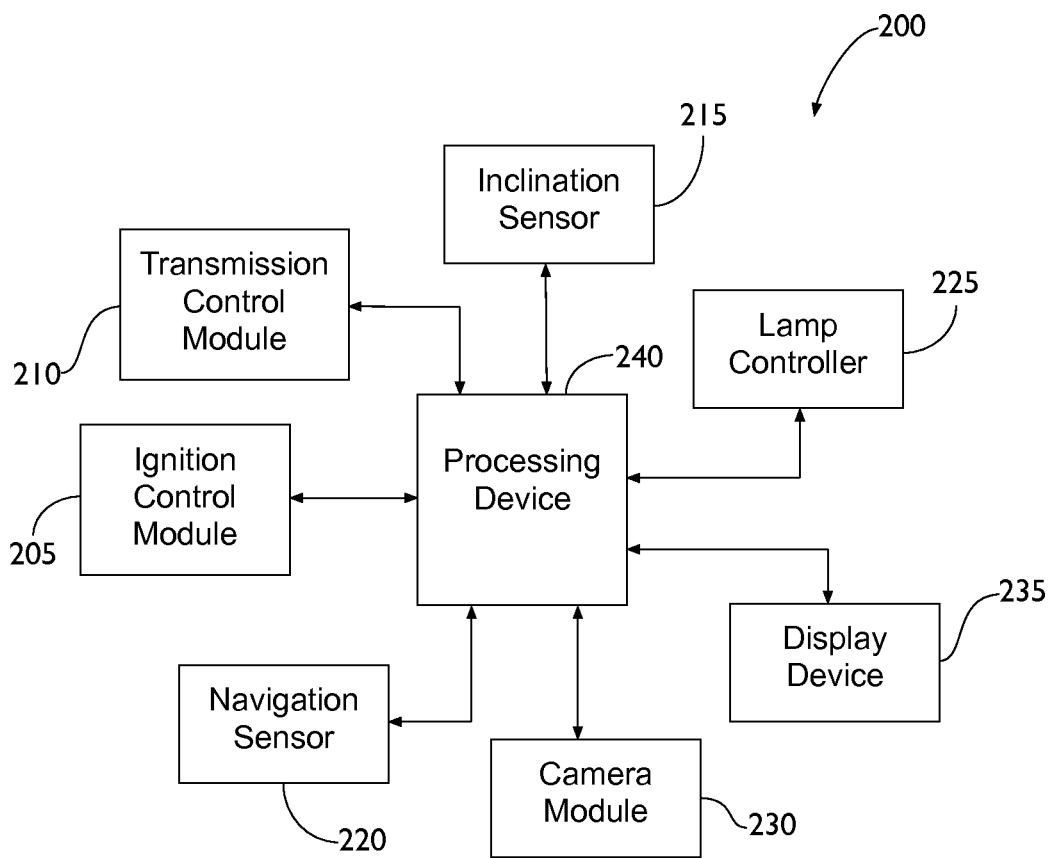
FIG. 2 is a block diagram of an exemplary system for determining the position of the tailgate.

An example system that can be used to determine whether a vehicle tailgate is open includes a camera module disposed on a vehicle. The camera module records an image of, e.g., the environment around the vehicle and generates an image signal representing the image. The system further includes a processing device that receives the image signal generated by the camera module and determines whether the vehicle tailgate is open based on the image. As discussed in greater detail below, the processing device may determine whether the vehicle tailgate is open based on whether the captured image includes a view from an environment behind the vehicle or below the vehicle (e.g., the road). An example method includes receiving an image signal representing an image captured from a vehicle, processing the image signal, and determining whether a vehicle tailgate is open based on the image. With the example system and method disclosed herein, the vehicle may alert the vehicle operator that the tailgate is open, especially if the operator is unable to see the tailgate from the passenger compartment, and help the operator return to the geographic location where the tailgate opened to recover lost items, if any.

The Figures illustrate a vehicle 100 implementing various systems and processes to detect whether a tailgate of the vehicle 100 is open or closed. The vehicle 100 may take many different forms and include multiple and/or alternate components and facilities. While an exemplary vehicle 100 is shown, the exemplary components illustrated in the Figures are not intended to be limiting. Indeed, additional or alternative components and/or implementations may be used.

The vehicle 100 is shown as a pickup truck in FIGS. 1A and 1B. The vehicle 100, however, can alternatively include a car, sport utility vehicle, van, minivan, or the like. As illustrated, the vehicle 100 includes a passenger compartment 105 and a cargo bay 110. The passenger compartment 105 may include any part of the vehicle 100 for receiving passengers. The passenger compartment 105 may therefore include one or more seats as well as controls for operating the vehicle 100. Examples of such controls may include a steering wheel, an accelerator pedal, and a brake pedal. The vehicle 100 may include other controls in the passenger compartment 105, and examples of other types of controls are discussed in greater detail below with respect to FIG. 2.

The cargo bay 110 may include any part of the vehicle 100 configured to store cargo. The cargo bay 110 of the vehicle 100 shown in FIG. 1 is covered by a tonneau cover 115. Access to the cargo bay 110 is further secured by a tailgate 130, which is shown in a closed position in FIG. 1A. FIG. 1B shows the tailgate 130 in an open position. The tailgate 130 further includes a camera 120. When the tailgate 130 is closed, the camera 120 is positioned to capture images from behind the vehicle 100. When the tailgate 130 is open, the camera 120 is positioned to capture images from under the tailgate 310. Examples of images captured based on the position of the tailgate 130 are shown and discussed with respect to FIGS. 3 and 4.

FIG. 2 illustrates exemplary components of a system 200 for determining the position of the tailgate 130. The system 200 as illustrated includes an ignition control module 205, a transmission control module 210, an inclination sensor 215, a navigation sensor 220, a lamp controller 225, a camera module 230, a display device 235, and a processing device 240.

The ignition control module 205 may be configured to control the timing of the ignition of a fuel-air mixture in an internal combustion engine of the vehicle 100. The ignition control module 205 may be configured to output signals to various components of the vehicle 100 such as the engine, battery, ignition coil, distributor, spark plugs, or the like. The ignition control module 205 may operate in accordance with an input from the vehicle operator provided via, e.g., a key placed into an ignition lock cylinder or a push-button based wireless smartkey. The input may command the ignition control module 205 to operate in an off mode, a run mode, an accessory mode, and a start mode. The off mode may command no power from the engine, and thus, no combustion takes place. Run mode may command the normal operating mode of the vehicle 100, in which case the ignition of the fuel-air mixture may be based on factors such as the desired speed of the vehicle 100. Accessory mode may command that the engine remain off but still allow some components of the vehicle 100 to draw power from the battery. Start mode may command the ignition control module 205 to start the engine. The ignition control module 205 may also control an all-electric or hybrid engine.

The transmission control module 210 may be configured to control the operation of an automatic transmission in the vehicle 100. In some possible implementations, the transmission control module 210 may receive inputs and select an operating state, based on various inputs, to provide a particular driving experience. Inputs may be received from a driver via, e.g., a gear shifter lever, a gear pushbutton bank or from an engine control module or another component of the vehicle 100. The transmission control module 210 may be further configured to output signals including signals that represent a selected gear state. Examples of gear states may include park, reverse, neutral, and one or more drive states. The park state may indicate that the output shaft of the transmission is locked so that the vehicle 100 will not move. The reverse state may permit the vehicle 100 to travel in a reverse direction (e.g., backward). The neutral state may disengage the input shaft from the output shaft to allow the vehicle 100 to coast.

The drive states may permit the vehicle 100 to move forward using a variety of gears. In some instances, one or more drive states may limit operation of the transmission to a particular gear or set of gears. On vehicles with manual transmissions there may be no transmission control module 210. However, inputs may be received from the driver via, e.g., a gear shifter lever or shift paddles.

The inclination sensor 215 may be configured to detect whether the vehicle 100 is on a sloped surface and output signals representing the degree of the incline. For instance, if the vehicle 100 is on a road with a 30-degree grade, the inclination sensor 215 may be configured to generate and output a signal that represents the magnitude of the incline (e.g., 30 degrees) as well as the direction. In some possible implementations, a positive value may indicate that the vehicle 100 is travelling uphill while a negative value may indicate that the vehicle 100 is travelling downhill.

The navigation sensor 220 may be configured to detect a relative location of the vehicle 100 and output a signal representing the relative location. For example, the navigation sensor 220 may be configured to communicate with multiple satellites in accordance with the Global Positioning System (GPS) to identify the location of the vehicle 100. The signal output by the navigation sensor 220 may represent the location relative to the satellites. Further, when GPS signals are lost, the navigation sensor 220 may also establish vehicle position using dead reckoning derived from the vehicle g-sensors or may established position based on UHF triangulation of a vehicle telematics module with its associated cellular tower.

The lamp controller 225 may be configured to control the operation of one or more lights or light assemblies in the vehicle 100. In some possible approaches, the lamp controller 225 may be configured to enable and disable the headlamps, auxiliary lamps, daytime running lamps, brake lamps, reverse lamps, lateral lamps such as the turn signals, convenience lamps, interior lights including the dome lights and dashboard backlighting, hazard lamps, or the like. The lamp controller 225 may be configured to receive inputs from various other systems in the vehicle 100 and control one or more lamp assemblies accordingly. For instance, the lamp controller 225 may be configured to automatically enable the dome lamps when a door of the vehicle 100 is opened. Alternatively or in addition, the lamp controller 225 may be configured to automatically enable the headlamps at night.

The camera module 230 may be configured to control the operation of one or more cameras 120 located on the vehicle 100. Some vehicles 100 are equipped with rear cameras 120 that allow an operator to see behind the vehicle 100 when, e.g., the transmission gear selector of vehicle 100 is placed in reverse. The camera module 230 may be configured to record images in real time and generate an image signal representing the image. The image signal may be output to the display device 235 so that the operator may view the captured image in real time. In some instances, captured images are sequentially presented to the operator as a video.

The display device 235 may be configured to present content, such as the video generated by the camera module 230, to an operator of the vehicle 100. The display device 235 may be configured to receive a signal and output a graphical user interface based at least in part on the received signal. For instance, the display device 235 may be configured to receive the image signal generated by the camera module 230 and display an image or video based on the image signal. In some instances, the display device 235 may include a touchscreen display configured to receive user inputs.

The processing device 240 may be configured to receive and process the image signal generated by the camera module 230 and determine whether the tailgate 130 is open based on the image. The processing device 240 may be configured to implement any number of image processing techniques. For instance, as described in greater detail below with regard to FIGS. 3 and 4, the processing device 240 may be configured to identify a first zone and a second zone in the image, compare the pixels of the first zone to the pixels of the second zone, and determine whether the tailgate 130 is open based on differences between the images of the first and second zones. Depending on the location of the camera 120 on the rear of the vehicle 100, the first zone may include an image of an environment behind the vehicle 100 while the second zone may include an image of the bumper 125. Thus, when the tailgate 130 is closed, the pixels of the first zone may change while the pixels of the second zone remain relatively constant. The processing device 240 may be configured to determine that the tailgate 130 is open if the pixels in the first zone and the second zone are substantially similar to one another or if the image in the first zone does not change consistently with movement of the vehicle. That is, when the tailgate 130 is open, the camera 120 may be generally pointed toward the ground, in which case the entire image may be of the road below the tailgate 130. Thus, when the tailgate 130 is open, the pixels in the first zone and in the second zone may be relatively homogeneous due to, e.g., in low light conditions or may be otherwise inconsistent with a normal view rearward from the vehicle 100.

The processing device 240 may be further configured to determine whether the pixels of the first and second zones are consistent with a normal rear view from the vehicle 100 based on a range of colors in one or both zones. For instance, when the tailgate 130 is closed, the image in the first zone may include a wide variety of colors while the image in the second zone may be limited to the color of the bumper 125. If the image in the second zone includes pixels of several different colors, the processing device 240 may be configured to determine that the tailgate 130 is open, especially if the colors of the image in the second zone are colors associated with a license plate or rear vehicle lamps and the image in the first zone includes colors associated with a road surface (e.g., yellow, black, gray, white, or the like).

In other possible implementations, the processing device 240 may be configured to determine that the tailgate 130 is open if the pixels in the first zone and the pixels in the second zone are changing at a substantially similar rate when the vehicle 100 is moving, especially in implementations where the bumper 125 will not be visible in the image when the tailgate 130 is open. Because the second zone may largely or completely include the bumper 125 when the tailgate 130 is closed, the image in the second zone will be substantially the same regardless of whether the vehicle 100 is moving. If the tailgate 130 is open, the image in the second zone may be of the road beneath the vehicle 100 and not the bumper 125. The image of the road will change as the vehicle 100 moves, and the processing device 240 may be configured to determine that the tailgate 130 is open if the pixels in the second zone change as the vehicle 100 moves. In other implementations, however, the bumper 125 will appear in the second zone regardless of whether the tailgate 130 is open or closed.

Moreover, the processing device 240 may be configured to determine whether the tailgate 130 is open by processing the image in the second zone without comparing the image in the second zone to the image in the first zone. For instance, the processing device 240 may be configured to determine whether the pixels in the second zone have a substantially uniform color, which may occur if the image in the second zone includes the bumper 125. If the bumper 125 appears in the image in the second zone, the processing device 240 may be configured to determine that the tailgate 130 is closed. If the pixels in the second zone do not have a substantially uniform color, which may occur if the second zone includes an image of a license plate or rear vehicle lamps along with the bumper 125, the processing device 240 may determine that the tailgate 130 is open.

Further, in low light conditions where it may not be possible to adequately distinguish two zones in the image field, the vehicle 100 may rapidly activate the back-up lamps or temporarily disable the rear license plate lamp and then look for the corresponding change in the image field. Only when the tailgate 130 is in an open position will the camera 130 be in position to detect changes in the rear vehicle lamps including the back-up lamps or license lamps. Because, by regulation, the back-up lamps must only be active in reverse and the license lamps must be active when lights are activated, the rapid cycling of these lamps should be in the order of less than 250 ms. In most cases the back-up lamps and license plate will be blocked by the tailgate 130 itself and vehicles behind the subject vehicle 100 will not notice these flickers.

The processing device 240 may be configured to prompt the operator of the vehicle 100 to confirm whether the tailgate 130 is open. The processing device 240 may be configured to output a signal to the display device 235, and the signal may cause the display device 235 to present an interface that includes the image to the operator. From the image, the operator may be able to visually verify whether the tailgate 130 is open. For instance, if the operator is able to view the environment behind the vehicle 100 through the display device 235, the operator may conclude that the tailgate 130 is closed. If the operator is able to view the road, the operator may conclude that the tailgate 130 is open. The processing device 240 may, via the display device 235, prompt the operator to provide an input confirming the status of the tailgate 130. If opened, the processing device 240 may further prompt the operator to manually close the tailgate 130 before proceeding.

In some instances, the tailgate 130 may be left open intentionally by the operator. To accommodate such instances, the processing device 240 may prompt the operator to ignore the indication that the tailgate 130 is open. The display device 235 may present, e.g., an ignore button that when pressed removes the image taken by the camera 120 from the display device 235. Further, ignoring the indication may cause the vehicle 100 to operate as if the tailgate 130 were closed.

The processing device 240 may be configured to interface with various components of the vehicle 100, such as one or more of the components discussed above. For example, the processing device 240 may be configured to receive location signals generated by the navigation sensor 220 and identify the geographic location where the tailgate 130 was first detected to be open. The processing device 240 may be configured to display, via the display device 235, the geographic location on a map. After prompting the operator to stop the vehicle 100 and close the tailgate 130, the processing device 240 may be configured to generate a path from a present location of the vehicle 100 to the location where the tailgate 130 opened so, e.g., the operator can determine whether any cargo was lost.

Moreover, the processing device 240 may be configured to determine that cargo is more likely to be lost when the vehicle 100 is travelling uphill with the tailgate 130 open. Thus, the processing device 240 may be further configured to monitor the magnitude of the incline of the vehicle 100 and identify geographic locations on a map where the tailgate 130 was open and the incline was greater than a predetermined threshold. The predetermined threshold may be based on a calibration value associated with a minimum road grade where cargo may slide or roll out of the cargo bay 110 when the tailgate 130 is open. The processing device 240 may be further configured to display, via the display device 235, the geographic locations where the magnitude of the incline of the vehicle 100 exceeded the predetermined threshold while the tailgate 130 was open to help the operator recover any lost cargo.

In general, computing systems and/or devices, such as processing device 240, the ignition control module 205, the transmission control module 210, and the camera module 230, may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., and the Linux operating system.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

The computing devices described above may be configured to access any number of databases, data repositories, or other data stores, which may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

Figure 3:
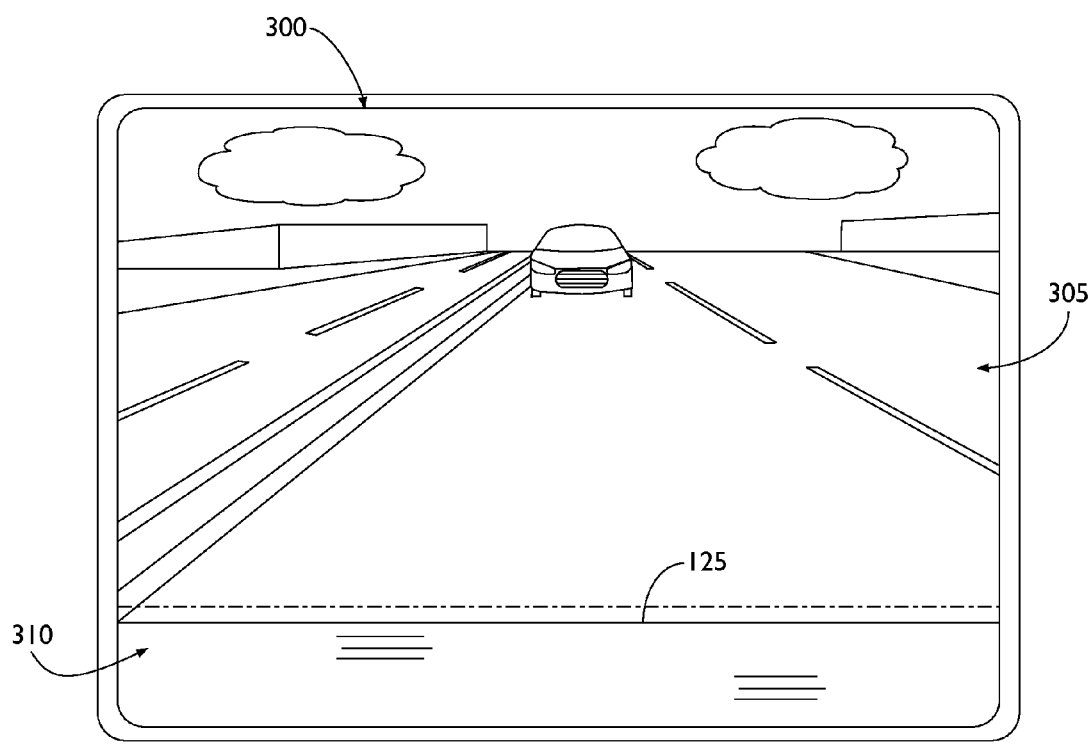
FIG. 3 is an example of an image taken from a camera on a rear of the vehicle when the tailgate is closed.

FIG. 3 is an example of an image 300 from when the tailgate 130 is closed and the camera 120 is aimed behind the vehicle 100. As illustrated, the image 300 is divided into a first zone 305 and a second zone 310. A dashed line is shown in FIG. 3 separating the first zone 305 from the second zone 310. This dashed line is presented for purposes of illustrating the difference between the zones 305 and 310 and may not be shown to the operator of the vehicle 100 in some implementations.

The first zone 305 shows the environment behind the vehicle 100. The environment may include the road, buildings, cars, people, or the like. The image shown in the second zone 310 may include the bumper 125. As discussed above, the processing device 240 may be configured to compare the pixels of the image in the first zone 305 to the pixels of the image in the second zone 310 to determine whether the tailgate 130 is open. In some possible approaches, the processing device 240 may be configured to determine whether the tailgate 130 is closed if the second zone 310 is substantially or completely occupied by the image of the bumper 125.

Figure 4:
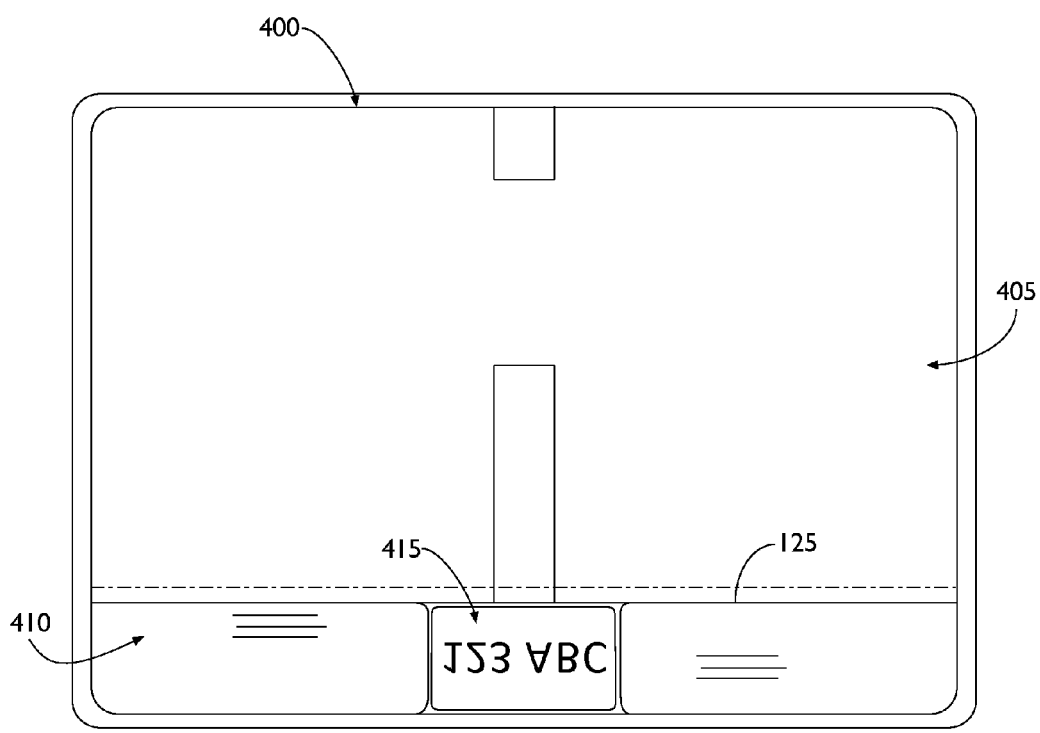
FIG. 4 is an example of an image taken from a camera when the tailgate is open.

FIG. 4 is an example of an image 400 from when the tailgate 130 is open and the camera 120 is generally aimed toward the ground. The first zone 405 may show a road surface beneath the tailgate 130 and the second zone 410 may show either the road surface or the bumper 125. The view of the bumper 125, as shown in FIG. 4, may further include a license plate 415 or other parts of the rear of the vehicle 100. As discussed above, the processing device 240 may be configured to determine that the tailgate 130 is open based on such an image 400. Furthermore, the dashed line separating the zones 405 and 410 in FIG. 4 is for illustrative purposes and may not be presented via the display device 235.

Figure 5:
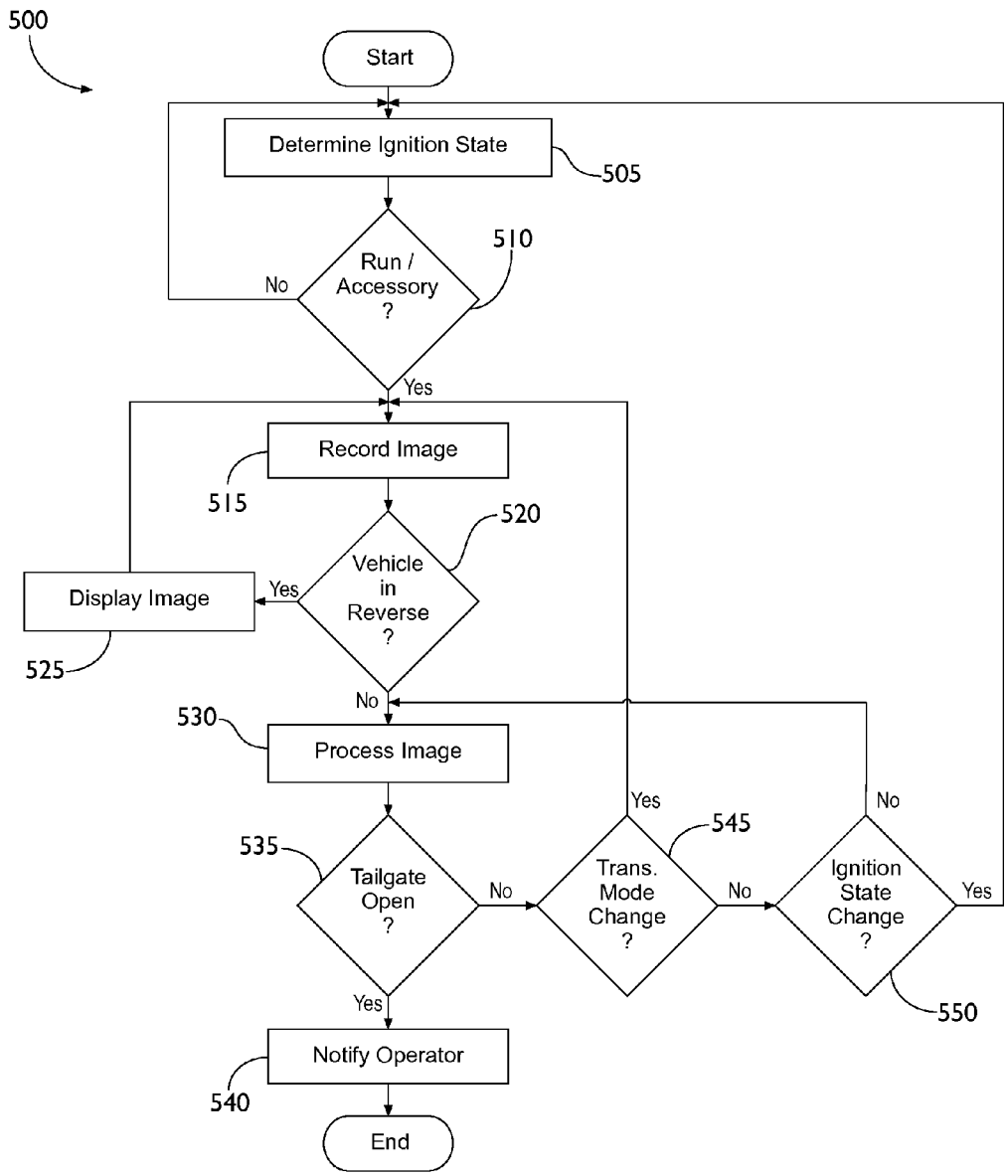
FIG. 5 illustrates a flowchart of an exemplary process that may be implemented by the system of FIG. 2.

FIG. 5 is a flowchart of an exemplary process 500 that may be implemented by one or more components of the system 200 of FIG. 2 to, e.g., determine whether the tailgate 130 is open and to take an appropriate corrective action.

At block 505, the processing device 240 may determine the ignition mode of the vehicle 100. In one possible approach, the processing device 240 may determine the ignition mode of the vehicle 100 based on one or more signals output by the ignition control module 205. Possible ignition modes may include "off," "run," "start," and "accessory."

At decision block 510, the processing device 240 may determine whether the ignition mode is either "run" or "accessory." If so, the process 500 may continue at block 515. If the ignition mode is determined to be "off," "start," or any other ignition mode, the process 500 may continue at block 505 until the ignition mode changes.

At block 515, the processing device 240 may receive the image signal generated by the camera module 230. The camera module 230, as discussed above, may generate the image signal based on an image taken by a camera 120 disposed on the tailgate 130 of the vehicle 100. The image signal may represent a real-time image or video captured from the vehicle 100.

At decision block 520, the processing device 240 may determine the state of the transmission. The transmission control module 210 may be configured to output a signal representing one or more gear states. Examples of gear states may include park, reverse, neutral, and one or more drive states. In some instances, the processing device 240 may only determine whether the tailgate 130 is open when the vehicle 100 is in the park, neutral, or drive states. Thus, if the vehicle 100 is in "reverse," the process 500 may continue at block 525. If the vehicle 100 is in any other state, the process 500 may continue at block 530.

At block 525, the processing device 240 may command the display device 235 to display the image from the camera module 230. This way, while the vehicle 100 is in a reverse gear and/or travelling in reverse, the operator of the vehicle 100 can see the environment behind the vehicle 100. If the tailgate 130 were inadvertently open, the operator would know because the image shown on the display device 235 would be of the road beneath the vehicle 100 instead of the environment behind the vehicle 100. Thus, the processing device 240 may not need to determine whether the tailgate 130 is open when the transmission is in the "reverse" state. After block 525, the process 500 may return to block 520. This path to block 525 may be employed optionally since there are situations, such as during a fresh snow storm on untraveled roads, where the image out the rear of closed tailgate 130 could look quite similar to the image of an open tailgate 130 (i.e., they would both appear mostly or all white).

At block 530, the processing device 240 may process the image signal to determine whether the tailgate 130 is open or closed. Processing the image may include identifying the first zone and the second zone in the image, gathering information about the pixels of each image, and comparing the pixels of each zone to one another. Example information gathered about the pixels may include the range of colors of the pixels of the image in the first zone and the range of colors of the pixels of the image in the second zone.

At decision block 535, the processing device 240 may determine whether the tailgate 130 is open or closed. For example, if the pixels of the image in the first zone are substantially similar to the pixels of the image in the second zone, the processing device 240 may conclude that the tailgate 130 is open. If the pixels are generally different, the processing device 240 may conclude that the tailgate 130 is closed. Alternatively or in addition, whether the tailgate 130 is open may be based on how quickly the pixels of the first zone change relative to the pixels of the second zone. When the tailgate 130 is closed, the pixels will change at different rates. Indeed, the pixels of the image in the second zone may not change at all or may change very infrequently. When the tailgate 130 is open, the pixels of the images in both the first zone and the second zone will change frequently as the vehicle 100 moves. In some implementations, the processing device 240 may determine whether the tailgate 130 is open based only on the pixels of the image in the second zone. As discussed above, when the tailgate 130 is closed, the image in the second may substantially be of the bumper 125 of the vehicle 100. When the tailgate 130 is open, however, the image in the second zone may be of the road below the tailgate 130 of vehicle 100 or include other parts of the vehicle 100 besides the bumper 125 such as a license plate. Thus, depending on the images in the first and second zones, and more specifically the range of colors of the pixels of the images, the processing device 240 may determine whether the tailgate 130 is open or closed. The process 500 may proceed according to whether the processing device 240 has determined whether the tailgate 130 is open or closed. If the processing device 240 determines that the tailgate 130 is open, the process 500 may continue at block 540. If the processing device 240 determines that the tailgate 130 is closed, the process 500 may continue at decision block 545.

At block 540, the processing device 240 may notify the operator that the tailgate 130 is open. In one possible approach, notifying the operator may include displaying the image on the display device 235 and prompting the operator to confirm whether the tailgate 130 is open or closed based on the image. The notification may further include a prompt for the operator to manually close the tailgate 130 and to confirm that the tailgate 130 has been closed. Moreover, the processing device 240 may present a map showing the geographic location of the vehicle 100 when the tailgate 130 was first determined to be open and an option to present a route for the vehicle 100 to return to that geographic location so the operator can look for any items that may have fallen out of the cargo bay 110.

At decision block 545, the processing device 240 may determine whether the gear state changed. That is, if the gear state changed from, e.g., drive to neutral and neutral to reverse. If so, the process 500 may return to decision block 520. If the gear state has not changed, the process 500 may continue at decision block 550.

At decisions block 550, the processing device 240 may determine whether the ignition mode has changed. The ignition mode may change if the operator turns the key from, e.g., "start" to "off." If the ignition mode changes, the process 500 may continue at block 505. If the ignition mode has not changed, the process 500 may continue at block 530.

Figure 6:
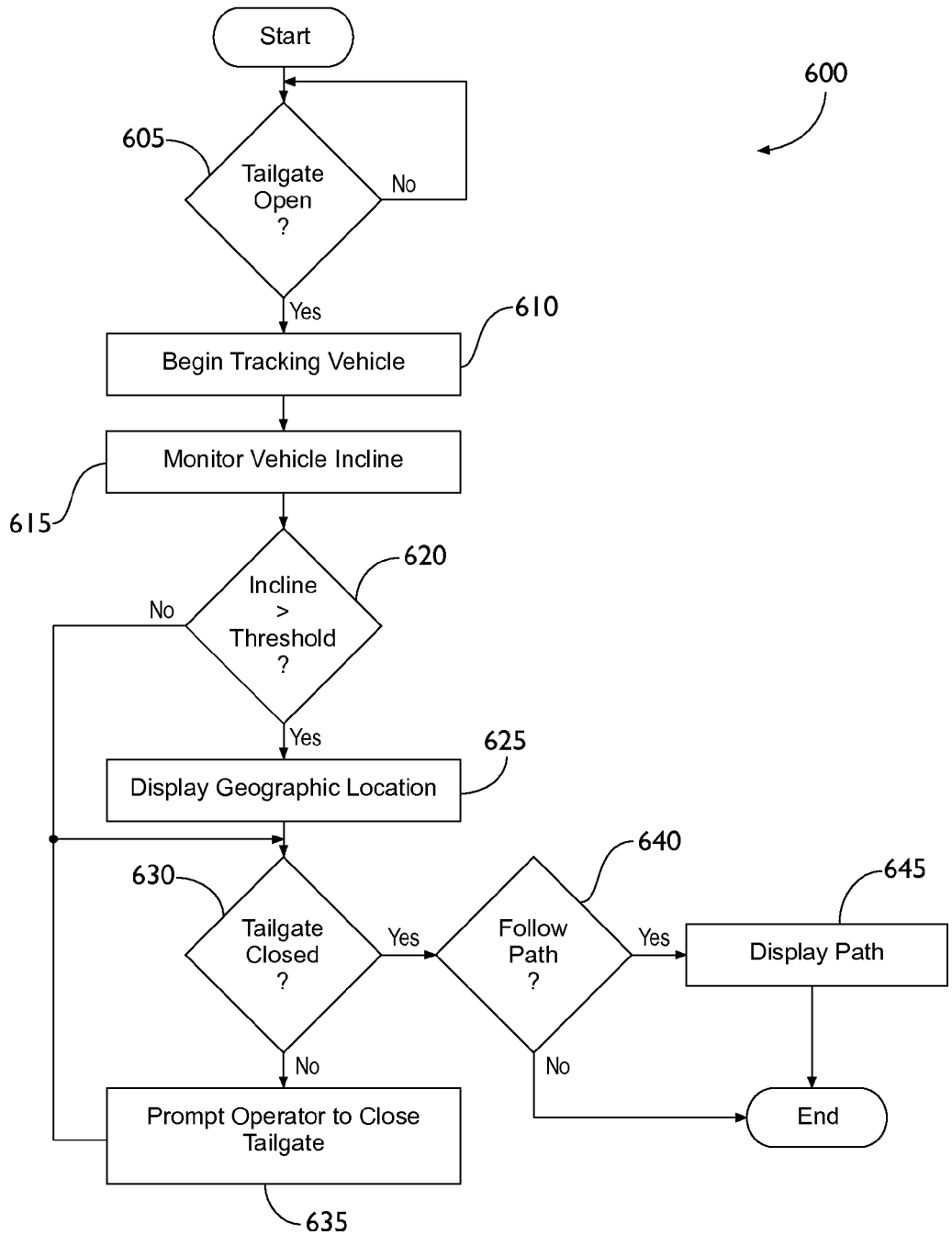
FIG. 6 is a flowchart of another exemplary process that may be implemented by the system of FIG. 2.

FIG. 6 is a flowchart of an example process 600 that may be implemented by one or more components of the system 200 of FIG. 2 to, e.g., help the operator recover any items that may have fallen out of the cargo bay 110 after the tailgate 130 opened.

At decision block 605, the processing device 240 may determine whether the tailgate 130 is open. If so, the process 600 may continue at block 610. If the tailgate 130 is closed, the process 600 may iteratively execute block 605 until the tailgate 130 opens.

At block 610, the processing device 240 may begin to monitor the geographic location of the vehicle 100 based on, e.g., signals output by the navigation sensor 220. As discussed above, the geographic location of the vehicle 100 may be used to help the operator of the vehicle 100 recover any items that may have fallen out of the cargo bay 110 while the tailgate 130 was inadvertently down.

At block 615, the processing device 240 may begin to monitor an incline of the vehicle 100. The processing device 240 may be configured to determine that items are more likely to be lost from the cargo bay 110 when the vehicle 100 is travelling uphill with the tailgate 130 open. Thus, the processing device 240 may monitor the incline of the vehicle 100 and identify geographic locations on a map where the tailgate 130 was open.

At decision block 620, the processing device 240 may determine whether the magnitude of the incline detected at block 615 exceed a predetermined threshold. The predetermined threshold may be based on a calibration value associated with a minimum road grade where cargo may slide or roll out of the cargo bay 110 when the tailgate 130 is open. If the magnitude of the incline exceeds the predetermined threshold, the process 600 may continue at block 625. If the magnitude of the incline is less than the predetermined threshold, the process 600 may continue at decision block 630.

At block 625, the processing device 240 may display, via the display device 235, the geographic locations where the magnitude of the incline of the vehicle 100 exceeded the predetermined threshold while the tailgate 130 was open so the operator of the vehicle 100 may determine the likely places items may have fallen out of the cargo bay 110.

At decision block 630, the processing device 240 may determine whether the tailgate 130 has been closed. If the tailgate 130 remains open, the process 600 may continue at block 635. If the tailgate 130 has been closed, the process 600 may continue at block 640.

At block 635, the processing device 240 may prompt the operator to close the tailgate 130 before proceeding. For instance, the processing device 240 may present a message to the operator via the display device 235. To accommodate instances where the tailgate 130 has been intentionally left open, the processing device 240 may prompt the operator to "ignore" the indication that the tailgate 130 is open.

At decision block 640, the processing device 240 may determine whether the operator wishes to follow a path back to a location where the tailgate 130 first opened and any other locations where the tailgate 130 was open while the vehicle 100 was moving. In some possible approaches, the processing device 240 may prompt the operator to select whether the operator wishes for the processing device 240 to determine a path for the vehicle 100 to follow. If the operator wishes to view and follow the path, the process 600 may continue at block 645. If the operator does not wish to view and follow the path, the process 600 may end.

At block 645, the processing device 240 may, via the display device 235, present the operator with the path that will take the vehicle 100 back to the geographic location where the tailgate 130 opened and any other locations where the tailgate 130 was open while the vehicle 100 was moving. Moreover, the processing device 240 may cause the display device 235 to show locations where the magnitude of the incline of the vehicle 100 exceeded the predetermined threshold, as determined at block 620.

The process 600 may end after block 645.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A system comprising:
    a camera module disposed on a vehicle and configured to record an image and generate an image signal representing the image;
    a processing device programmed to receive the image signal generated by the camera module and determine whether a vehicle tailgate is open based on the image recorded by the camera, wherein the processing device is programmed to identify a first zone and a second zone in the image and determine whether the vehicle tailgate is open based on the first zone and the second zone comparison recorded by the camera module.

2. The system of claim 1, wherein the processing device is configured to determine that the vehicle tailgate is open if the first zone shows a road surface beneath the tailgate.

3. The system of claim 1, wherein the processing device is configured to determine that the vehicle tailgate is open if the first zone and the second zone are changing at a substantially similar rate while the vehicle is moving.

4. The system of claim 1, wherein the processing device is configured to determine that the vehicle tailgate is open based on whether the image includes a license plate of the vehicle.

5. The system of claim 1, wherein the processing device is configured to determine whether the vehicle tailgate is open based on changes to the image after rear vehicle lamps are turned on.

6. The system of claim 1, wherein the processing device is configured to present the image to a vehicle operator via a display device and prompt the vehicle operator to confirm whether the vehicle tailgate is open.

7. The system of claim 1, wherein the processing device is configured to identify a location where the vehicle tailgate opened and display, via a display device, a path from a present location to the location where the vehicle tailgate opened.

8. The system of claim 1, wherein the processing device is configured to monitor a vehicle incline and compare the vehicle incline to a predetermined threshold and display, via a display device, a location where the vehicle incline exceeded the predetermined threshold while the vehicle tailgate is open.

9. A method comprising:
    receiving an image signal representing an image captured from a vehicle;
    processing the image signal;
    determining, via a processing device, whether a vehicle tailgate is open based on the image;
    identifying a first zone and a second zone in the image;
    comparing the first zone to the second zone; and
    notifying a vehicle occupant if the processing device determines, based on the first zone and the second zone in the image, that the vehicle tailgate is open.

10. The method of claim 9, wherein the vehicle tailgate is determined to be open if the first zone shows a road surface below the tailgate.

11. The method of claim 9, wherein the vehicle tailgate is determined to be open if the first zone and the second zone are changing at a substantially similar rate while the vehicle is moving.

12. The method of claim 9, wherein the vehicle tailgate is determined to be open based on changes to the image after rear vehicle lamps are turned on.

13. The method of claim 9, further comprising:
    presenting the image to a vehicle operator via a display device; and
    prompting the vehicle operator to confirm whether the vehicle tailgate is open.

14. The method of claim 9, further comprising:
    identifying a location where the vehicle tailgate opened; and
    displaying, via a display device, a path from a present location to the location where the vehicle tailgate opened.

15. The method of claim 9, further comprising:
    monitoring a vehicle incline; and
    comparing the vehicle incline to a predetermined threshold.

16. The method of claim 15, further comprising displaying, via a display device, a location where the vehicle incline exceeded the predetermined threshold while the vehicle tailgate is open.

17. A non-transitory computer-readable medium tangibly embodying computer-executable instructions that cause a processor to execute operations comprising:
    receiving an image signal representing an image captured from a vehicle;
    processing the image signal;
    determining whether a vehicle tailgate is open based on the image
    identifying a first zone and a second zone in the image;
    compare the first zone to the second zone; and
    generating a notification to a vehicle occupant if the processor device determines, based on the first zone and the second zone in the image, that the vehicle tailgate is open; and
    generating a notification to a vehicle occupant if the processor determines, based on the image, that the vehicle tailgate is open.

18. The computer-readable medium of claim 17, wherein the tailgate is determined to be open if the first zone is substantially similar to the second zone, if the first zone and the second zone are changing at a substantially similar rate while the vehicle is moving, or based on changes to the image after rear vehicle lamps are turned on.

* * * * *